Dec. 4, 1951  G. E. CUTTAT  2,577,311
COUPLING DEVICE FOR TWO COLINEAR SHAFTS
Filed Dec. 28, 1946  2 SHEETS—SHEET 1
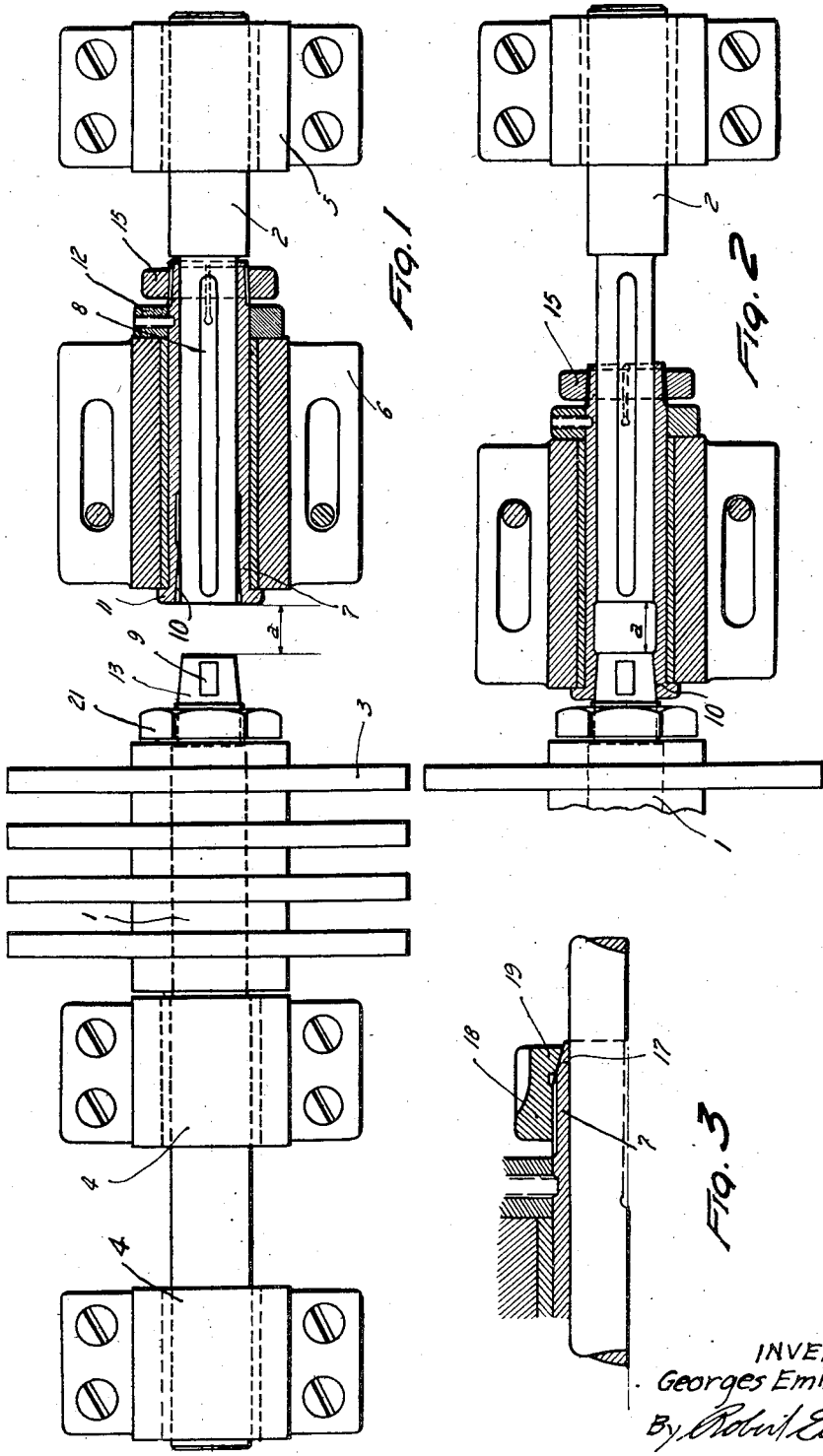
INVENTOR
Georges Emile Cuttat
By Robert E. Burns
ATTORNEY Dec. 4, 1951     G. E. CUTTAT     2,577,311
COUPLING DEVICE FOR TWO COLINEAR SHAFTS
Filed Dec. 28, 1946     2 SHEETS—SHEET 2
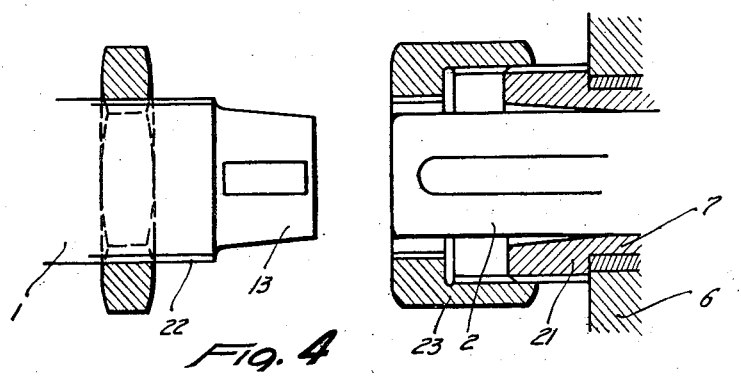
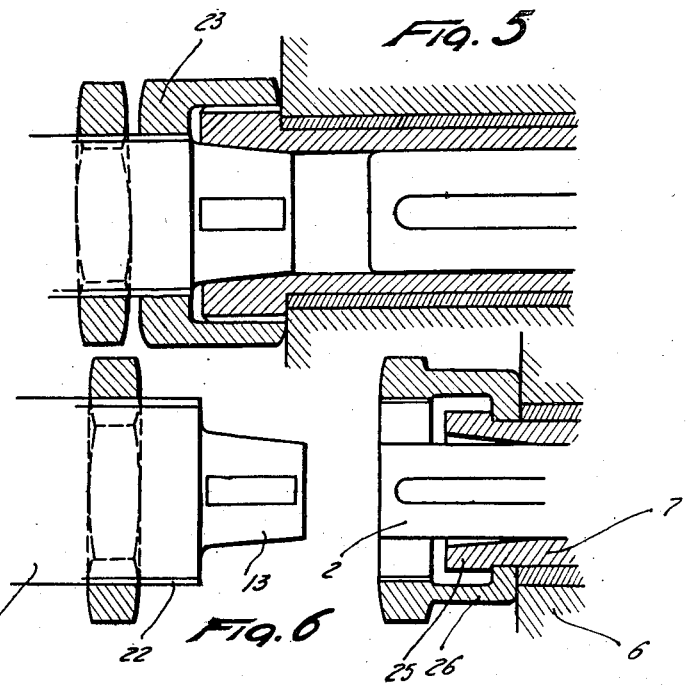
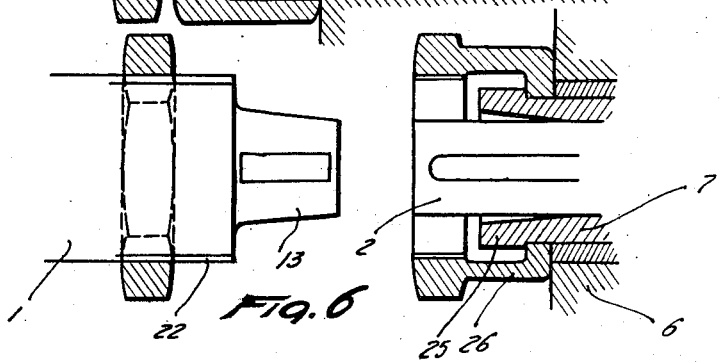
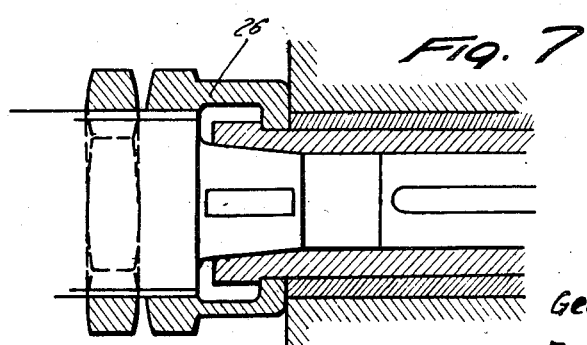
INVENTOR
Georges Emile Cuttat
By Robert E. Burns
ATTORNEY

UNITED STATES PATENT OFFICE 2,577,311

COUPLING DEVICE FOR TWO COLINEAR SHAFTS

Georges Emile Cuttat, Geneva, Switzerland, assignor to Manufacture de Machines du Haut-Rhin, Haut-Rhin, France, a company of France Application December 28, 1946, Serial No. 719,084
In France August 1, 1939

Section 1, Public Law 690, August 8, 1946
Patent expires August 1, 1959

6 Claims. (Cl. 287—108)

The present invention relates to a coupling device for colinear shafts whose ends are separated by an intermediate space allowing certain dismantlings, this coupling device ensuring, nevertheless, the rigidity, without any flexure, of the whole device.

This is particularly advantageous in automatic machines where the motions of the various organs are obtained by means of cams keyed on a shaft. These cams must be capable of being rapidly dismantled to allow their replacement by other cams of different profiles and, to remove them, they are passed in the intermediate space provided between the two ends of the shafts.

In accordance with the present invention, the association of the two shafts is ensured by a sheath capable of sliding without turning on the two shaft ends and presenting, at one of its ends, a conical female part engaging a conical male part provided on one of the shaft ends, a device being provided for locking, later on, this sheath with respect to the shafts.

Preferably, the sheath in question will be carried by an inner bearing inside which it will turn, laterally, the longitudinal displacement being obtained by displacement of the entire bearing, thus supporting the shaft very efficiently at the point of lack of continuity.

Several types of embodiments of the coupling device which are an object of the present invention will be described hereinafter by way of examples and are represented on the appended drawing in which:

Figure 1 represents, in longitudinal section, a first embodiment of the coupling device in the disengaged position;

Figure 2 represents it in the engaged position;

Figure 3 shows a detail modification;

Figures 4 and 5 show another type of embodiment in the disengaged and engaged positions.

And Figures 6 and 7 show another embodiment in the same manner.

The driving shaft (Figures 1 and 2), is designated by 1 and carries cams 3 separated by spacing rings. The driven shaft is designated by 2. Between the ends of these two shafts, an intermediate space a is provided. Shaft 1 is supported by fixed bearings 4 and shaft 2 is supported by fixed bearing 5 and by movable bearing 6 capable of being offset longitudinally. This movable bearing 6 carries a sheath 7, with a longitudinal groove capable of sliding on keys associated with the shaft ends. Thus the sheath can slide without any rotation with relation to the shafts. Sheath 7 is held on the bearing between flange 11 and a collar 12 fixed on the sheath. At its front end, sheath 7 forms a female cone 10 capable of engaging with male cone 13 provided at the end of shaft 1. At its rear end, the sheath tapers gradually, and has longitudinal slots. These longitudinal slots allow the reduction of the inner diameter of the tapered part. The tapered conical part at the rear end of the sheath 7 is provided with a thread on which is engaged nut 15, with an inside thread, conical and corresponding thereto.

To pass the coupling device from the uncoupled position to the coupled position (Figure 1 to Figure 2), bearing 6 is shifted towards the left. Under such conditions, the female conical part of sheath 7 is engaged over the male cone 13 at the end of shaft 1. This motion can be imparted to bearing 6 either by hand (for small machines) or by a mechanical action, for instance by a rack and pinion (for larger machines).

When sheath 7 is in position, it is locked longitudinally on shaft 2 by tightening conical nut 15. This tightening action has for its effect to reduce the inner diameter of the tapered part of sheath 7, as allowed by the longitudinal slots of said tapered part.

The embodiment shown in Figure 3 is more economical, in that it avoids the necessity of a conical thread.

It will be seen that sheath 7 has a thread on its cylindrical portion and that portion 17, conical, and fitted with slots, is not threaded. Nut 18 has a cylindrical thread which engages the thread on the sheath, and a portion 19, in the shape of a female cone which acts on portion 17 of the sheath. It will be seen that by tightening nut 18, and portion 19, the longitudinal fixation of sheath 7 on shaft 2 will be obtained.

For dismantling, the parts being in the position of Figure 1, it will be sufficient to remove nut 21 and to take up separately the cams 3 and spacing rings and to pass the same through the intermediate space a.

When the stresses to be transmitted are considerably greater, it will be more advantageous to use the types of embodiments of Figures 4 and 5 or 6 and 7.

In the type of realisation of Figures 4 and 5, sheath 7 has, at the end placed towards cone 13, a shoulder forming a collar 21, threaded in opposite direction to thread 22 on shaft 1, back of cone 13. Over this thread is engaged a nut having itself two threads of opposite pitch, capable of screwing both on thread 22 and on collar 21.

It will be seen (Figure 5) that when nut 23 is tightened on thread 22, this nut locks the female conical part of the sheath 21 on the male cone 13 of shaft 1, and that the loosening of this nut has the reverse effect.

In the embodiment of Figures 6 and 7, sheath 7 also has a shoulder 25 forming a collar, but not threaded, and, under this shoulder engages the flange of a nut 26 having simply an inside thread capable of screwing on thread 22 back of the male cone 13.

It is clear (Figure 7), that the tightening of nut 26 will lock the female cone over the male cone, and that, when loosened, this nut, pushing against bearing 6 will separate the two cones.

What I claim is:

1. A coupling device for two axially-spaced colinear shafts, comprising a slidable sheath non-rotatably mounted at the end of one of said shafts and having at one of its ends a conical female part, a corresponding conical male part provided on the end of the other of said shafts, a bearing supporting said sheath, said bearing being axially displaceable with respect to said shafts, and means for locking longitudinally said sheath on at least one of said shafts.

2. A coupling device as claimed in claim 1, characterized by the fact that the means for locking the sheath longitudinally is arranged at the end of the sheath opposite to the male conical part and comprises a conical externally threaded part of the sheath with longitudinal slots, and a nut with a corresponding conical internally threaded part engaging said threaded conical part.

3. A coupling device as claimed in claim 1, characterized by the fact that the means for locking the sheath longitudinally comprises an externally threaded cylindrical part of the sheath, a conical unthreaded part of the sheath with longitudinal slots, and a nut the threaded part whereof engages the threaded cylindrical part of the sheath and having a female conical part capable of exerting a pressure on the unthreaded conical part of the sheath.

4. A coupling device as claimed in claim 1, characterized by the fact that the means for locking the sheath, placed at the end nearest to the male conical part of the second shaft, comprises an externally threaded flange at the female end of the sheath, a threaded part, back of the male conical part, on the male end part of the second shaft, and a nut with two threads in opposite directions, engaging respectively the externally threaded flange of the sheath and the threaded part back of the male conical part.

5. A coupling device, as claimed in claim 1, which comprises an unthreaded flange at the female end of the sheath, a threaded part back of the male conical end part of the second shaft, and a nut comprising a thread engaging the threaded part of the second shaft and a clamping part engaging the flange of the sheath.

6. A coupling device for two axially-spaced colinear shafts, comprising a slidable sheath non-rotatably mounted at the end of one of said shafts and having at one of its ends a conical female part, a corresponding conical male part provided on the end of the other of said shafts, a bearing supporting said sheath, said bearing being axially displaceable with respect to said shafts, and means for locking longitudinally said female conical part of said sheath to said male conical part.

GEORGES EMILE CUTTAT.

REFERENCES CITED

The following references are of record in the file of this patent:

UNITED STATES PATENTS

| Number | Name | Date |
|---|---|---|
| 2,379,771 | Weidauer et al. | July 3, 1945 |